(12) United States Patent
Okazaki et al.

(10) Patent No.: US 11,806,746 B2
(45) Date of Patent: Nov. 7, 2023

(54) MULTILAYER COATING FILM AND METHOD FOR FORMING MULTILAYER COATING FILM

(71) Applicant: KANSAI PAINT CO., LTD., Hyogo (JP)

(72) Inventors: Hirokazu Okazaki, Kanagawa (JP); Nobuhiko Narita, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 128 days.

(21) Appl. No.: 17/441,112

(22) PCT Filed: Dec. 13, 2019

(86) PCT No.: PCT/JP2019/048989
§ 371 (c)(1),
(2) Date: Sep. 20, 2021

(87) PCT Pub. No.: WO2020/194911
PCT Pub. Date: Oct. 1, 2020

(65) Prior Publication Data
US 2022/0168777 A1    Jun. 2, 2022

(30) Foreign Application Priority Data

Mar. 22, 2019 (JP) .................................. 2019-054011

(51) Int. Cl.
*B05D 7/00* (2006.01)
*B32B 7/023* (2019.01)

(52) U.S. Cl.
CPC .............. *B05D 7/574* (2013.01); *B32B 7/023* (2019.01); *B05D 2202/10* (2013.01)

(58) Field of Classification Search
CPC ...... B05D 2202/10; B05D 7/574; B05D 5/06; B05D 7/54; B05D 7/58; B32B 7/023; C12Q 1/6888; C12Q 2600/124; C12Q 2600/156

See application file for complete search history.

(56) References Cited

U.S. PATENT DOCUMENTS

| | | |
|---|---|---|
| 2005/0208292 A1 | 9/2005 | Kuramochi et al. |
| 2015/0217332 A1 | 8/2015 | Fujii et al. |

(Continued)

FOREIGN PATENT DOCUMENTS

| | | |
|---|---|---|
| CN | 107708878 | 2/2018 |
| EP | 3725517 | 10/2020 |

(Continued)

OTHER PUBLICATIONS

Machine translation of JP 2012-045478, Hayata et al, Mar. 8, 2012 (Year: 2012).*

(Continued)

*Primary Examiner* — Frances Tischler
(74) *Attorney, Agent, or Firm* — Wenderoth, Lind & Ponack, L.L.P.

(57) ABSTRACT

Provided is a multilayer coating film comprising an effect base coating film and a colored base coating film formed on the effect base coating film, wherein when $X=[(C^*45)^2+(C^*75)^2]^{1/2}$ and $Y=[(L^*15)^2+(C^*15)^2]^{1/2}+[(L^*25)^2+(C^*25)^2]^{1/2}$, X is 80 or more and Y is 145 or more (wherein $C^*15$, $C^*25$, $C^*45$, and $C^*75$ represent chroma values calculated from spectral reflectances of light illuminated at an incident angle of 45 degrees and received at light-receiving angles of 15 degrees, 25 degrees, 45 degrees, and 75 degrees deviated from specular reflection light to the side closer to the incident light; and $L^*15$ and $L^*25$ represent lightness values when light illuminated at an incident angle of 45 degrees is received at light-receiving angles of 15 degrees and 25

(Continued)

degrees deviated from specular reflection light to the side closer to the incident light).

5 Claims, 1 Drawing Sheet

(56) References Cited

U.S. PATENT DOCUMENTS

2016/0354805 A1 12/2016 Fujiwara
2018/0214912 A1 8/2018 Itoh et al.

FOREIGN PATENT DOCUMENTS

| JP | 2005-169385 | 6/2005 |
|---|---|---|
| JP | 2006-289247 | 10/2006 |
| JP | 2007-167720 | 7/2007 |
| JP | 2012-45478 | 3/2012 |
| JP | 2014-42891 | 3/2014 |
| WO | 2015/099151 | 7/2015 |

OTHER PUBLICATIONS

Office Action dated Aug. 1, 2022 for the corresponding CN patent application No. 201980094280.8, with English machine translation.
Extended European Search Report dated Nov. 17, 2022 in corresponding European Patent Application No. 19921774.6.
International Search Report dated Mar. 17, 2020 in International (PCT) Application No. PCT/JP2019/048989.

* cited by examiner

_US 11,806,746 B2_

MULTILAYER COATING FILM AND METHOD FOR FORMING MULTILAYER COATING FILM

TECHNICAL FIELD

The present invention relates to a multilayer coating film and a method for forming a multilayer coating film.

BACKGROUND ART

The main purpose of applying paint is to protect materials, and to impart an excellent appearance to materials. In industrial products, great value is placed on excellent appearance, in particular "color and texture," to enhance product appeal. Although the texture of the industrial products desired by consumers varies, pearly or metallic luster has recently been in demand in fields such as automobile exterior panels, automobile parts, and home appliances. Pearly luster and metallic luster are collectively referred to as "pearly or metallic luster" below.

For example, Patent Literature (PTL) 1 discloses a method for forming a multilayer coating film having a metallic base coating film formed of a metallic base paint containing a color pigment and an effect pigment, and a colored base coating film formed of a colored base paint containing a color pigment, wherein a transparent clear coating film formed of a transparent clear paint is formed on at least the uppermost layer, the metallic base coating film has a lightness L* value of 60 or less, and the colored base coating film has a light transmittance of 30% or more to 50% or less at a wavelength of 400 nm or more to 700 nm or less.

CITATION LIST

Patent Literature

PTL 1: JP2007-167720A

SUMMARY OF INVENTION

Technical Problem

The coating film obtained in Patent Literature (PTL) 1 is poor in vividness and brightness. More specifically, in order to create deepness, multilayer coating films of the prior art have a significant reduction in chroma in the range from the face to the bottom.

An object of the present invention is to provide a more vivid and bright multilayer coating film with a pearly or metallic luster, and provide a method for forming the multilayer coating film. This object is achieved by decreasing the reduction in chroma in the range from the face to the bottom while maintaining high chroma and lightness of the multilayer coating film.

Solution to Problem

According to a first aspect of the present invention, the invention provides a multilayer coating film comprising an effect base coating film and a colored base coating film formed on the effect base coating film, wherein when $X=[(C^*45)^2+(C^*75)^2]^{1/2}$ and $Y=[(L^*15)^2+(C^*15)^2]^{1/2}+[(L^*25)^2+(C^*25)^2]^{1/2}$, X is 80 or more and Y is 145 or more (wherein C*15, C*25, C*45, and C*75 represent chroma values of the multilayer coating film when light illuminated at an incident angle of 45 degrees is received at light-receiving angles of 15 degrees, 25 degrees, 45 degrees, and 75 degrees deviated from specular reflection light to the side closer to the incident light, and L*15 and L*25 represent lightness values of the multilayer coating film when light illuminated at an incident angle of 45 degrees is received at light-receiving angles of 15 degrees and 25 degrees deviated from specular reflection light to the side closer to the incident light.)

In one embodiment of the multilayer coating film, the multilayer coating film has a graininess of 60 or less as measured in terms of HG value.

In another embodiment of the multilayer coating film, the effect base coating film contains an effect pigment in an amount of 3 to 75 parts by mass, on a solids basis, based on 100 parts by mass of the effect base coating film.

In another embodiment of the multilayer coating film, the effect base coating film contains a color pigment in an amount of 40 parts by mass or less, on a solids basis, based on 100 parts by mass of the effect base coating film.

In another embodiment, the multilayer coating film further comprises an intermediate coating film disposed under the effect base coating film and having an L*45 value of 60 or more (wherein L*45 represents a lightness value of the intermediate coating film when light illuminated at an incident angle of 45 degrees is received at a light-receiving angle of 45 degrees deviated from specular reflection light to the side closer to the incident light).

In another embodiment, the multilayer coating film further comprises a clear coating film on the colored base coating film.

According to a second aspect of the present invention, the invention provides an object comprising the multilayer coating film of any one of the above items.

According to a third aspect of the present invention, the invention provides a method for forming a multilayer coating film comprising the following steps (1) to (3):

step (1) of applying an effect base paint (X) to a substrate to form an effect base coating film;

step (2) of applying a colored base paint (Y) to the effect base coating film to form a colored base coating film; and step (3) of separately or concurrently heating the effect base coating film formed in step (1) and the colored base coating film formed in step (2) to cure the coating films, wherein the multilayer coating film satisfies the following conditions:

when $X=[(C^*45)^2+(C^*75)^2]^{1/2}$ and $Y=[(L^*15)^2+(C^*15)^2]^{1/2}+[(L^*25)^2+(C^*25)^2]^{1/2}$, X is 80 or more and Y is 145 or more (wherein C*15, C+25, C*45, and C*75 represent chroma values when light illuminated at an incident angle of 45 degrees is received at light-receiving angles of 15 degrees, 25 degrees, 45 degrees, and 75 degrees deviated from specular reflection light to the side closer to the incident light; and L*15 and L*25 represent lightness values when light illuminated at an incident angle of 45 degrees is received at light-receiving angles of 15 degrees and 25 degrees deviated from specular reflection light to the side closer to the incident light).

In one embodiment of the method for producing a multilayer coating film, the effect base paint (X) contains water, an effect pigment, a surface adjusting agent, and a rheology control agent.

In another embodiment of the method for producing a multilayer coating film, the effect base paint (X) contains 3 to 75 parts by mass of an effect pigment on a solids basis, based on 100 parts by mass of the effect base coating film on a solids basis.

In another embodiment of the method for producing a multilayer coating film, the effect base coating film has a thickness of 0.2 to 4.5 µm on a dry film basis.

Advantageous Effects of Invention

According to the multilayer coating film of the present invention, a more vivid and bright multilayer coating film with a pearly or metallic luster is provided. Such a multilayer coating film can impart a vivid, bright, and highly attractive appearance to an object to which the multilayer coating film is applied.

DESCRIPTION OF EMBODIMENTS

The multilayer coating film of the present invention comprises an effect base coating film and a colored base coating film formed on the effect base coating film, wherein when $X=[(C^*45)^2+(C^*75)^2]^{1/2}$ (Equation 1) and $Y=[(L^*15)^2+(C^*15)^2]^{1/2}+[(L^*25)^2+(C^*25)^2]^{1/2}$ (Equation 2), X is 80 or more, and Y is 145 or more.

$C^*15$, $C^*25$, $C^*45$, and $C^*75$ represent chroma values of the multilayer coating film when light illuminated at an incident angle of 45 degrees is received at light-receiving angles of 15 degrees, 25 degrees, 45 degrees, and 75 degrees deviated from specular reflection light to the side closer to the incident light. $C^*15$, $C^*25$, $C^*45$, and $C^*75$ are defined as numerical values of chroma calculated from spectral reflectances of light illuminated at an incident angle of 45 degrees and received at light-receiving angles of 15 degrees, 25 degrees, 45 degrees, and 75 degrees deviated from specular reflection light to the side closer to the incident light, as measured using a multi-angle spectrophotometer (produced by X-Rite Inc., trade name: MA-68II).

$L^*15$ and $L^*25$ represent lightness values of the multilayer coating film when light illuminated at an incident angle of 45 degrees is received at light-receiving angles of 15 degrees and 25 degrees deviated from specular reflection light to the side closer to the incident light. $L^*15$ and $L^*25$ are defined as numerical values of lightness calculated from spectral reflectances of light illuminated at an incident angle of 45 degrees and received at light-receiving angles of 15 degrees and 25 degrees deviated from specular reflection light to the side closer to the incident light, as measured using a multi-angle spectrophotometer (produced by X-Rite Inc., trade name: MA-68II).

The term "highlight" means observing a multilayer coating film near the specular reflection light. The term "bottom" means observing a multilayer coating film at an angle that is not affected by specular reflection light. The term "face" means observing a multilayer coating film from an angle between the highlight and the bottom.

Figure 1:
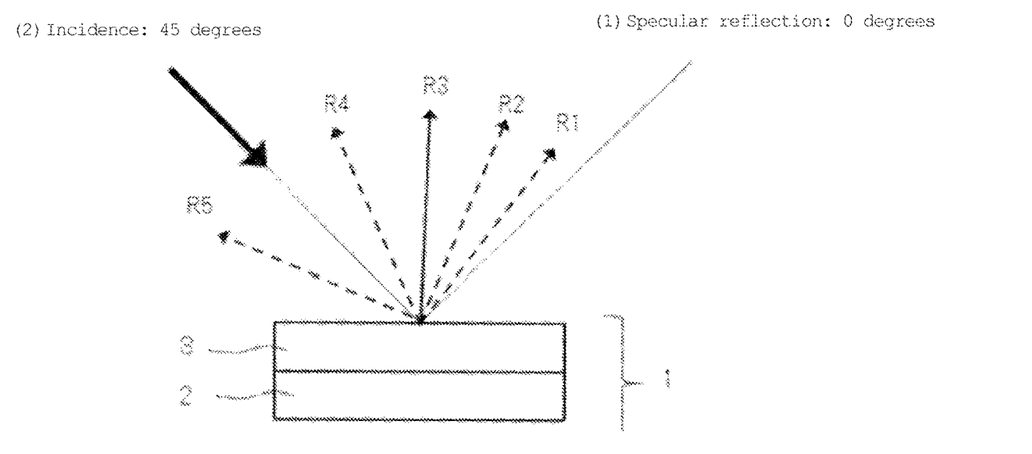
FIG. 1 illustrates the coating film structure and luster distribution according to angle changes.

As shown in FIG. 1, in the present application, the spectral reflectances of light received at angles of 15 degrees (R1), 25 degrees (R2), 45 degrees (R3), 75 degrees (R4), and 110 degrees (R5) deviated from specular reflection light were measured using a multi-angle spectrophotometer (produced by X-Rite Inc., trade name: MA-68II) in order to accurately determine optical properties of laminate 1 from fewer measured reflectances in the angle range from the highlight at an angle of 15 degrees deviated from the specular reflection light (1) to the bottom at an angle of 110 degrees deviated from the specular reflection light. Among these, there was little difference between the chroma values at 110 degrees and 75 degrees. Therefore, for chroma, the spectral reflectance values measured at four angles, i.e., 15 degrees (R1), 25 degrees (R2), 45 degrees (R3), and 75 degrees (R4) from the highlight to the face, were used. For lightness, the spectral reflectance values measured at two angles, i.e., 15 degrees (R1) and 25 degrees (R2) in the highlight, were used. FIG. 1 illustrates a multilayer coating film 1 comprising an effect base layer 2 and a colored base layer 3 formed on the effect base layer 2.

X in Equation 1 is an index of chroma in which $C^*45$, which is chroma in the face (at 45 degrees) and $C^*75$, which is chroma in the bottom (at 75 degrees), are expressed as variables. A large X value indicates that the chroma is high irrespective of angle changes in the face and the bottom. X can be used as a chroma scale of a multilayer coating film in the face and the bottom perceived by an observer viewing the multilayer coating film.

If X is less than 80, the target color of the multilayer coating film is observed as dull due to a large reduction in chroma from the face to bottom range. The upper limit of X is not particularly limited, but is preferably 130 or less, more preferably 120 or less, and even more preferably 110 or less.

Y in Equation 2 is an index of chroma and lightness in which $C^*15$, which is chroma at 15 degrees, $C^*25$, which is chroma at 25 degrees, $L^*15$, which is lightness at 15 degrees, and $L^*25$, which is lightness at 25 degrees, are expressed as variables. 15 degrees and 25 degrees are angles in the highlight at which the reflectance changes abruptly. Y can be used as a scale of a combination of chroma and lightness of the multilayer coating film in the highlight perceived by an observer viewing the multilayer coating film.

If Y is less than 145, the multilayer coating film has inferior chroma and lightness in the highlight. The upper limit of Y is not particularly limited, but is preferably 210 or less, more preferably 200 or less, and even more preferably 190 or less.

X is 80 or more, preferably greater than 80, more preferably 85 or more, and even more preferably 90 or more, and Y is 145 or more, preferably 150 or more, and even more preferably 160 or more. In this case, a multilayer coating film with high lightness in the highlight and high chroma in a wide range from the highlight to the bottom can be obtained.

The graininess is expressed as a hi-light graininess value (abbreviated below as the "HG value"). The HG value is a parameter of microscopic brilliance obtained by microscopic observation, and indicates the graininess in the highlight (observation of the multilayer coating film from near the specular reflection light against incident light). The HG value is a measured value calculated as follows. First, the multilayer coating film is photographed with a CCD camera at an incident angle of 15 degrees and a light-receiving angle of 0 degrees, and the obtained digital image data, i.e., two-dimensional luminance distribution data, is subjected to two-dimensional Fourier transform to obtain a power spectrum image. Subsequently, only the spatial frequency domain corresponding to graininess is extracted from the power spectrum image, and the obtained measurement parameter is converted to an HG value from 0 to 100 that has a linear relation with graininess. An HG value of 0 indicates no graininess, and an HG value of almost 100 indicates the highest possible graininess.

The multilayer coating film of the present invention preferably has an HG value of 60 or less, more preferably 58 or less, and even more preferably 55 or less. Thus, a multilayer coating film having low graininess and exhibiting a color with a delicate impression can be obtained. An HG value of more than 60 is not desirable because a multi-layer coating film that exhibits a color with a delicate impression cannot be obtained.

Composition of Each Coating Layer of the Multilayer Coating Film

Next, the composition of each coating layer of the multilayer coating film is explained.

Effect Base Coating Film

The effect base coating film can usually contain an effect pigment, a surface adjusting agent, and a rheology control agent.

The effect base coating film is formed by applying the effect base paint (X) and preferably drying the paint.

The effect base paint (X) contains water as a main solvent and can comprise an effect pigment, a surface adjusting agent, and a rheology control agent.

Examples of the effect pigment include light interference pigments, vapor-deposition metal flake pigments, aluminum flake pigments, and the like. One or a combination of two or more of these pigments can be suitably selected for use, depending on the texture desired for the coating film. From the standpoint of obtaining high chroma in a wide range from the highlight to the bottom, light interference pigments are preferable.

The light interference pigment can be, for example, a pigment prepared by coating the surface of a transparent or translucent flaky base material, such as natural mica, synthetic mica, glass, or various metal oxides (e.g., iron oxide and aluminum oxide) with a metal oxide that has a refractive index different from that of the base material. The light interference pigment can be a single pigment, or a combination of two or more pigments.

Natural mica is a flaky base material obtained by pulverizing mica from ore. Synthetic mica is synthesized by heating an industrial material, such as $SiO_2$, $MgO$, $Al_2O_3$, $K_2SiF_6$, or $Na_2SiF_6$, to melt the material at a high temperature of about 1500° C. and cooling the melt for crystallization. When compared with natural mica, synthetic mica contains a smaller amount of impurities and has a more uniform size and thickness. Specific examples of synthetic mica base materials include fluorophlogopite ($KMg_3AlSi_3O_{10}F_2$), potassium tetrasilicon mica ($KMg_{2.5}AlSi_4O_{10}F_2$), sodium tetrasilicon mica ($NaMg_{2.5}AlSi_4O_{10}F_2$), Na taeniolite ($NaMg_2LiSi_4O_{10}F_2$), LiNa taeniolite ($LiMg_2LiSi_{40}F_2$), and the like.

Examples of metal oxides with which the base material is coated include iron oxide, titanium oxide, and the like. Interference pigments can develop various different interference colors depending on the difference in the thickness of the metal oxide.

Specific examples of interference pigments include metal oxide-coated mica pigments, metal oxide-coated alumina flake pigments, metal oxide-coated glass flake pigments, metal oxide-coated silica flake pigments, and the like, described below.

Metal oxide-coated mica pigments are pigments obtained by coating the surface of a natural mica or synthetic mica base material with a metal oxide.

Metal oxide-coated alumina flake pigments are pigments obtained by coating the surface of an alumina flake base material with a metal oxide. Alumina flakes refer to flaky (thin) aluminum oxides, which are clear and colorless. Alumina flakes do not necessarily consist of only aluminum oxide, and may contain other metal oxides.

Metal oxide-coated glass flake pigments are pigments obtained by coating the surface of a flaky glass base material with a metal oxide. The metal oxide-coated glass flake pigments have a smooth base material surface, which causes intense light reflection.

Metal oxide-coated silica flake pigments are pigments obtained by coating flaky silica, which is a base material having a smooth surface and a uniform thickness, with a metal oxide.

Among the interference pigments, those obtained by coating the surface of a base material, such as natural mica, synthetic mica, silicon dioxide, or aluminum oxide, with a metal oxide, such as titanium oxide or iron oxide, are preferable from the viewpoint of increasing the lightness and chroma in the highlight of the coating film. Such pigments are called "pearl pigments" because they have a pearly texture and transparency. Examples of pearl pigments include white pearl pigments that are obtained by coating the surface of a natural or synthetic mica base material with titanium oxide, and that exhibit white color due to reflection of multiple-reflection light; interference pearl pigments that are obtained by coating the surface of a natural or synthetic mica base material with titanium oxide, and that develop a color due to interference of multiple reflection light; color pearl pigments that are obtained by coating the surface of a natural or synthetic mica base material with iron oxide; and the like.

From the standpoint of obtaining high chroma and lightness in the highlight of the obtained multilayer coating film and maintaining high chroma in the range from the face to the bottom, the light interference pigment has an average particle size in the range of 5 to 30 μm, and particularly 7 to 20 μm.

In the present specification, the average particle size refers to the average particle size (D50) on a volume basis, which is the 50% value of the particle size distribution measured with a laser diffraction particle size analyzer.

From the standpoint of obtaining a multilayer coating film with a high chroma and lightness in the highlight and maintaining a high chroma in the range from the face to the bottom, the interference pigment for use preferably has a thickness of 0.05 to 1 μm, and particularly preferably in the range of 0.1 to 0.8 μm.

The thickness as used herein is obtained in such a manner that when a cross-section of a coating film containing an effect pigment is observed with an optical microscope, the minor axis of the effect pigment particles is measured using image-processing software, and the average of the measured values of 100 or more particles is defined as the thickness.

The vapor-deposition aluminum flake pigment is obtained by vapor-depositing a metal film on a base material, removing the base material, and then grinding the vapor-deposition metal film. Examples of the base material include films and the like.

The material of the above metal is not particularly limited. Examples include aluminum, gold, silver, copper, brass, titanium, chromium, nickel, nickel chromium, stainless steel, and the like. Among these, aluminum or chromium is particularly preferable from the standpoints of, for example, availability and ease in handling. In the present specification, a vapor deposition metal flake pigment obtained by vapor-depositing aluminum is referred to as a "vapor deposition aluminum flake pigment," and a vapor deposition metal flake pigment obtained by vapor-depositing chromium is referred to as a "vapor deposition chromium flake pigment."

The vapor deposition metal flake pigment for use may be a vapor deposition metal flake pigment formed from a single layer of a vapor deposition metal film, or a vapor deposition metal flake pigment formed from a multilayer composed of a vapor deposition metal film and additional other metal or metal oxide.

From the standpoint of, for example, obtaining a coating film with excellent storage stability and metallic luster, the vapor deposition aluminum flake pigment is preferably surface-treated with silica.

Examples of commercial products that can be used as the vapor deposition aluminum flake pigment include Metalure series (trade name, produced by Eckart), Hydroshine WS series (trade name, produced by Eckart), Decomet series (trade name, produced by Schlenk), Metasheen series (trade name, produced by BASF), and the like.

Examples of commercial products that can be used as the vapor deposition chromium flake pigment include Metalure Liquid Black series (trade name, produced by Eckart).

The average thickness of the vapor deposition metal flake pigment is preferably 0.01 to 1.0 µm, and more preferably 0.015 to 0.1 µm.

The vapor deposition metal flake pigment has an average particle size of preferably 1 to 50 µm, and more preferably 5 to 20 µm.

An average particle size of more than the upper limit described above may cause graininess in the multilayer coating film, whereas an average particle size of less than the lower limit described above may lead to an overly small change in lightness from the highlight to the bottom. In both cases, the metallic luster may be lacking.

The aluminum flake pigment is typically produced by crushing and grinding aluminum by using a grinding aid in a ball mill or attritor mill in the presence of a grinding liquid medium. Grinding aids for use in the production step of the aluminum flake pigment include higher fatty acids, such as oleic acid, stearic acid, isostearic acid, lauric acid, palmitic acid, and myristic acid; as well as aliphatic amines, aliphatic amides, and aliphatic alcohols. Grinding liquid media for use include aliphatic hydrocarbons, such as a mineral spirit.

The aluminum flake pigment for use may be a colored aluminum pigment prepared by coating the surface of an aluminum flake pigment with a color pigment, and further coating it with a resin; or a colored aluminum pigment prepared by coating the surface of an aluminum flake pigment with a metal oxide such as iron oxide.

From the standpoint of forming a dense metallic film that exhibits high gloss in the highlight with lower graininess, the aluminum flake pigment for use preferably has an average particle size of 1 to 100 µm, more preferably 5 to 50 µm, and particularly preferably 7 to 30 µm. The aluminum flake pigment for use preferably has a thickness of 0.01 to 2.0 µm, and particularly preferably 0.02 to 1.0 µm.

From the standpoint of obtaining excellent pearly or metallic luster of the obtained multilayer coating film and a high chroma and lightness in the highlight and maintaining a high degree of chroma in the range from the face to the bottom, the content of the effect pigment in the effect base paint (X) is preferably 3 to 75 parts by mass, more preferably 5 to 65 parts by mass, and even more preferably 10 to 60 parts by mass on a solids basis, based on 100 parts by mass of the effect base paint (X) on a solids basis.

In the present specification, "solids" refers to non-volatile matter, which is a residue obtained by removing volatile components, such as water and an organic solvent, from a sample. The solids content can be calculated by multiplying the mass of the sample by the solids concentration. The solids concentration can be determined by dividing the mass of a residue obtained by drying 3 g of a sample at 105° C. for 3 hours by the mass of the sample before being dried.

The surface adjusting agent is used to facilitate uniform orientation of the above effect pigment dispersed in water on an object when the effect base paint (X) is applied to the object. As the surface adjusting agent, a known surface adjusting agent can be used.

Examples of the surface adjusting agent include silicone-based surface adjusting agents, acrylic-based surface adjusting agents, vinyl-based surface adjusting agents, fluorine-based surface adjusting agents, acetylenediol-based surface adjusting agents, and like surface adjusting agents. These surface adjusting agents can be used singly, or in a combination of two or more.

Examples of usable silicone-based surface adjusting agents include polydimethylsiloxane and modified silicone obtained by modifying polydimethylsiloxane. Examples of modified silicone include polyether-modified silicone, acrylic-modified silicone, polyester-modified silicone, and the like.

Examples of commercial products of surface adjusting agents include BYK series produced by BYK-Chemie; Tego series produced by Evonik; Glanol series and Polyflow series produced by Kyoeisha Chemical Co., Ltd.; Disparlon series produced by Kusumoto Chemicals, Ltd.; Surfynol (registered trademark) series produced by Evonik Industries; and the like.

From the standpoint of obtaining a multilayer coating film having a high lightness and chroma in the highlight and maintaining a high degree of chroma in the range from the face to the bottom, an appropriate content of the surface adjusting agent in the effect base paint (X) is 4 to 400 parts by mass, preferably 5 to 100 parts by mass, and more preferably 8 to 60 parts by mass on a solids basis, based on 100 parts by mass of the effect pigment on a solids basis.

From the standpoint of obtaining a multilayer coating film having a high lightness and chroma in the highlight and maintaining a high chroma in the range from the face to the bottom, the solids content of the surface adjusting agent is 0.01 to 40 parts by mass, more preferably 0.02 to 35 parts by mass, and even more preferably 0.05 to 30 parts by mass, based on 100 parts by mass of the total solids content of the effect base paint (X).

As the rheology control agent, a known rheology control agent can be used. Examples include silica-based fine powder, mineral-based rheology control agents, barium sulfate atomization powder, polyamide-based rheology control agents, organic resin fine particle rheology control agents, diurea-based rheology control agents, urethane-association rheology control agents, acrylic swelling-type polyacrylic acid-based rheology control agents, cellulose-based rheology control agents, and the like. Among these, from the standpoint of obtaining a coating film with excellent pearly or metallic luster, it is preferable to use a mineral-based rheology control agent, a polyacrylic acid-based rheology control agent, or a cellulose-based rheology control agent; and it is particularly preferable to use a cellulose-based rheology control agent. These rheology control agents may be used singly, or in a combination of two or more.

Examples of mineral-based rheology control agents include swelling laminar silicate that has a 2:1 crystal structure. Specific examples include smectite group clay minerals, such as natural or synthetic montmorillonite, saponite, hectorite, stevensite, beidellite, nontronite, bentonite, and laponite; swelling mica group clay minerals, such as Na-type tetrasilicic fluorine mica, Li-type tetrasilicic fluorine mica, Na salt-type fluorine taeniolite, and Li-type fluorine taeniolite; vermiculite; substitution products or derivatives thereof; and mixtures thereof.

Examples of polyacrylic acid-based rheology control agents include sodium polyacrylate, polyacrylic acid-(meth)acrylic acid ester copolymers, and the like.

Examples of commercial products of polyacrylic acid-based rheology control agents include Primal ASE-60, Primal TT615, and Primal RM5 (trade names, all produced by The Dow Chemical Company); SN Thickener 613, SN Thickener 618, SN Thickener 630, SN Thickener 634, and SN Thickener 636 (trade names, all produced by San Nopco Limited); and the like. The acid value of the solids content of the polyacrylic acid-based rheology control agent is within the range of 30 to 300 mg KOH/g, and preferably 80 to 280 mg KOH/g.

Examples of cellulose-based rheology control agents include carboxymethylcellulose, methylcellulose, hydroxyethylcellulose, hydroxyethylmethylcellulose, hydroxypropylmethylcellulose, methylcellulose, cellulose nanofibers, and the like. Among these, cellulose nanofibers are preferably used, in terms of obtaining a coating film with excellent pearly or metallic luster.

The cellulose nanofibers may also be referred to as "cellulose nanofibrils," "fibrillated cellulose," or "nanocellulose crystals."

The cellulose nanofibers have a number average fiber diameter within the range of preferably 2 to 500 nm, more preferably 2 to 250 nm, even more preferably 2 to 150 nm, in terms of obtaining a coating film with excellent pearly or metallic luster. The cellulose nanofibers also have a number average fiber length within the range of preferably 0.1 to 20 μm, more preferably 0.1 to 15 μm, and even more preferably 0.1 to 10 μm.

The number average fiber diameter and number average fiber length are measured and calculated from, for example, an image obtained by subjecting a sample (cellulose nanofibers diluted with water) to a dispersion treatment, casting the sample on a grid coated with a carbon film that has been subjected to a hydrophilic treatment, and observing the sample with a transmission electron microscope (TEM).

The cellulose nanofibers for use may be those obtained by defibrating a cellulose material and stabilizing it in water. The cellulose material as used herein refers to various forms of cellulose-based materials. Specific examples include pulp (e.g., grass plant-derived pulp, such as wood pulp, jute, Manila hemp, and kenaf); natural cellulose, such as cellulose produced by microorganisms; regenerated cellulose obtained by dissolving cellulose in a copper ammonia solution, a solvent of a morpholine derivative, or the like, and subjecting the dissolved cellulose to spinning; fine cellulose obtained by subjecting the cellulose material to, for example, a mechanical treatment, such as hydrolysis, alkali hydrolysis, enzymatic decomposition, blasting treatment, and vibration ball milling, to depolymerize the cellulose; and the like.

For the cellulose nanofibers, anionically modified cellulose nanofibers can be used. Examples of anionically modified cellulose nanofibers include carboxylated cellulose nanofibers, carboxymethylated cellulose nanofibers, sulfonate group-containing cellulose nanofibers, phosphate group-containing cellulose nanofibers, and the like. The anionically modified cellulose nanofibers can be obtained, for example, by incorporating functional groups such as carboxyl groups, carboxymethyl groups, and phosphate groups into a cellulose material by a known method; washing the obtained modified cellulose to prepare a dispersion of the modified cellulose; and defibrating this dispersion. The carboxylated cellulose is also referred to as "oxidized cellulose."

The oxidized cellulose can be obtained, for example, by oxidizing the cellulose material in water using an oxidizing agent in the presence of a compound selected from the group consisting of an N-oxyl compound, bromide, iodide, and a mixture thereof.

Examples of commercial products of the cellulose nanofibers include Rheocrysta (registered trademark) produced by DKS Co. Ltd., and the like.

From the standpoint of obtaining a multilayer coating film having a high lightness and chroma in the highlight and maintaining a high chroma in the range from the face to the bottom, the content of the rheology control agent in the effect base paint (X) is preferably 0.1 to 97 parts by mass, more preferably 0.5 to 80 parts by mass, and even more preferably 1 to 60 parts by mass, on a solids basis, based on 100 parts by mass of the total solids content of the effect base paint (X).

The effect base paint (X) may further optionally contain, for example, a pigment other than the effect pigment, an organic solvent, a pigment dispersant, a pigment derivative, an antisettling agent, a base resin and/or a dispersion resin, a curing agent, an antifoaming agent, an ultraviolet absorber, a light stabilizer, and the like.

The effect base paint (X) may contain pigments other than the effect pigment, such as color pigments and extender pigments.

Specific examples of color pigments include, but are not limited to, organic pigments such as benzimidazoline-based pigments, pyrazolone-based pigments, azo-based pigments, quinacridone-based pigments, diketopyrrolopyrroles-based pigments, perylene-based pigments, perinone-based pigments, isoindoline-based pigments, isoindolinone-based pigments, metal chelate azo-based pigments, phthalocyanine-based pigments, indanthrone-based pigments, dioxazine-based pigments, threne-based pigments, and indigo-based pigments; composite oxide-based inorganic pigments; carbon black pigments; and the like. These pigments can be used singly, or in a combination of two or more. Among these, yellow pigments, orange pigments, or red pigments are preferably used. Red pigments are more preferable.

When a color pigment is used, the content of the color pigment is 40 parts by mass or less, preferably 20 parts by mass or less, and more preferably 0.1 to 15 parts by mass on a solids basis, based on 100 parts by mass of the effect base paint (X) on a solids basis, from the standpoint of obtaining a multilayer coating film having a high chroma and lightness in the highlight and maintaining a high chroma in the range from the face to the bottom. The content of the color pigment is 40 parts by mass or less, preferably 20 parts by mass or less, and more preferably 0.1 to 15 parts by mass, on a solids basis, based on 100 parts by mass of the effect base paint (X) on a solids basis.

Examples of extender pigments include talc, silica, calcium carbonate, barium sulfate, zinc white (zinc oxide), and the like. These pigments can be used singly, or in a combination of two or more.

Examples of the base resin include acrylic resins, polyester resins, alkyd resins, urethane resins, and the like. As the dispersion resin, existing dispersion resins, such as acrylic resin-based dispersion resins, epoxy resin-based dispersion resins, polycarboxylic acid resin-based dispersion resins, and polyester-based dispersion resins, can be used. The curing agent is selected from the group consisting of melamine, melamine derivatives, urea resins, (meth)acrylamide, polyaziridine, polycarbodiimide, blocked or unblocked polyisocyanate compounds, (meth)acrylamide, and copolymers of N-methylol group- or N-alkoxymethyl group-containing (meth)acrylamide. These can be used singly, or in a combination of two or more.

The effect base paint (X) is prepared by mixing and dispersing the above components. From the standpoint of obtaining a coating film with excellent pearly or metallic luster, the solids content during coating is preferably 0.5 to 10 mass %, preferably 1 to 8 mass %. From the standpoint of obtaining a coating film with excellent pearly or metallic luster, the viscosity of the effect base paint (X) at a temperature of 20° C. as measured with a Brookfield viscometer at 60 rpm after 1 minute (also referred to as "the B60 value" in the present specification) is preferably 50 to 900 mPa·s, and more preferably 100 to 800 mPa·s. The viscometer used for this measurement is a VDA digital Vismetron viscometer (a Brookfield viscometer, produced by Shibaura System Co., Ltd.).

The effect base paint (X) can be applied by a method such as electrostatic coating, air spray, or airless spray. In particular, rotary-atomization electrostatic coating is preferably used.

From the standpoint of obtaining a coating film with excellent pearly or metallic luster, the film thickness 30 seconds after the effect base paint (X) is applied to the substrate is preferably 3 to 100 μm, more preferably 4 to 80 μm, and even more preferably 5 to 60 μm.

From the standpoint of obtaining a coating film with excellent pearly or metallic luster, the effect base coating film preferably has a thickness of 0.2 to 4.5 μm, more preferably 0.2 to 4 μm, and particularly preferably 0.2 to 3.5 μm, on a dry film basis.

In the present specification, the dry film thickness is calculated from the following Equation (3).

$$x = (sc*10000)/(S*sg) \qquad \text{(Equation 3)}$$

x: film thickness [μm]
sc: coating solids content [g]
S: evaluation area of coating solids content [cm$^2$]
sg: coating film specific gravity [g/cm$^3$]

Colored Base Coating Film

The colored base coating film usually contains a resin component and a color pigment. The colored base coating film is formed by applying a colored base paint (Y) and preferably drying the paint.

The colored base paint (Y) preferably contains a color pigment, water, and/or an organic solvent. The resin component typically contains a base resin and a curing agent. The resin component for use may be known resins or compounds commonly used in the art. Examples of base resins include acrylic resins, polyester resins, epoxy resins, and polyurethane resins. Examples of curing agents include amino resins, polyisocyanate compounds, and blocked polyisocyanate compounds.

The colored base paint (Y) may be an aqueous paint or a solvent-based paint. From the standpoint of decreasing VOCs of the paint, the colored base paint (Y) is preferably an aqueous paint. When the colored base paint is an aqueous paint, the base resin for use can be a resin that contains hydrophilic groups (e.g., a carboxyl group, a hydroxyl group, a methylol group, an amino group, a sulfonate group, and a polyoxyethylene group; and most preferably a carboxyl group) in an amount sufficient to solubilize or disperse the resin in water. By neutralizing the hydrophilic groups, the base resin can be solubilized or dispersed in water.

Examples of color pigments include, but are not limited to, organic pigments such as benzimidazolone-based pigments, pyrazolone-based pigments, azo-based pigments, quinacridone-based pigments, diketopyrrolopyrrole-based pigments, perylene-based pigments, perinone-based pigments, isoindoline-based pigments, isoindolinone-based pigments, metal chelate azo-based pigments, phthalocyanine-based pigments, indanthrone-based pigments, dioxazine-based pigments, threne-based pigments, and indigo-based pigments; composite oxide-based inorganic pigments; titanium white and carbon black pigments; and the like. These pigments can be used singly, or in a combination of two or more. Among these, yellow pigments, orange pigments, or red pigments are preferably used. Red pigments are more preferable.

From the standpoint of obtaining a multilayer coating film with a high chroma and lightness in the highlight and maintaining a high chroma in the range from the face to the bottom, the content of the color pigment is preferably 0.1 to 10 parts by mass, and more preferably 0.5 to 5 parts by mass, on a solids basis, based on 100 parts by mass of the resin solids content of the colored base paint (Y) on a solids basis.

The colored base paint (Y) contains a resin component and a color pigment as described above and may further optionally contain one or more UV absorbers, light stabilizers, antifoaming agents, thickeners, organic solvents, surface adjusting agents, pigments other than the color pigment, and the like.

Examples of pigments other than the color pigment include extender pigments, effect pigments, and the like. These pigments can be used singly, or in a combination of two or more.

Examples of extender pigments include clay, kaolin, barium sulfate, barium carbonate, calcium carbonate, talc, silica, alumina white, and the like. Among these, barium sulfate and/or talc is preferably used. In particular, it is preferable to use barium sulfate with an average primary particle size of 1 μm or less, and more preferably 0.01 to 0.8 μm, as the extender pigment to provide a multilayer coating film having appearance with excellent smoothness.

In the present specification, the average primary particle size of barium sulfate is determined by observing barium sulfate using a scanning electron microscope, and averaging the maximum diameter of 20 barium sulfate particles on a straight line drawn at random on the electron microscope photograph.

When the colored base paint (Y) contains an extender pigment such as those described above, the content of the extender pigment is preferably 30 parts by mass or less, more preferably 0.1 to 20 parts by mass, based on 100 parts by mass of the resin solids content of the colored base paint.

From the standpoint of obtaining a multilayer coating film with a high chroma and lightness in the highlight and maintaining a high chroma in the range from the face to the bottom, the cured film thickness of the base coating film obtained using the colored base paint is preferably about 5.0 to 40 μm, more preferably about 8.0 to 35 μm, and even more preferably about 10 to 30 μm.

The colored base paint can be applied by a usual method. Examples include air-spray coating, airless spray coating, rotary-atomization coating, and like methods. When the colored base paint is applied, electrostatic charge may be applied, if necessary. In particular, rotary-atomization electrostatic coating and air-spray electrostatic coating are preferable, with rotary-atomization electrostatic coating being particularly preferable.

When air-spray coating, airless spray coating, or rotary-atomization coating is performed, the colored base paint is preferably adjusted to have a solids content and a viscosity suitable for coating by adding water and/or an organic solvent, and optional additives such as a rheology control agent and an antifoaming agent.

The colored base paint has a solids content of 10 to 60 mass %, preferably 15 to 55 mass %, and more preferably 20 to 50 mass %. The colored base paint has a viscosity of preferably 200 to 7000 cps, more preferably 300 to 6000 cps, and even more preferably 500 to 5000 cps, as measured with a Brookfield viscometer at 20° C. and at 6 rpm.

The value of X in Equation 1 and the value of Y in Equation 2 of the multilayer coating film of the present invention can be suitably set by a person skilled in the art by selecting the components and their contents in the effect base paint (X) and the colored base paint (Y). This makes it possible to more easily form a multilayer coating film with high lightness and chroma in the highlight and with high chroma in the range from the face to the bottom.

The multilayer coating film of the present invention has a hue angle h in the L*C*h color space chromaticity diagram within the range of 300° to 3600 and 0° to 1200, more preferably within the range of 330° to 360° and 0° to 90, even more preferably within the range of 0° to 450, and still even more preferably within the range of 15° to 45°.

The value h represents a hue of the multilayer coating film when light illuminated at an incident angle of 45 degrees is received at an angle of 45 degrees deviated from specular reflection light to the side closer to the incident light.

The L*C*h color space refers to a color system devised based on the L*a*b* color space, which was standardized in 1976 by the Commission Internationale de l'Eclairage, and also adopted in JIS Z 8729.

The multilayer coating film of the present invention may further comprise, in addition to the effect base coating film and the color base costing film, at least one coating film selected from an intermediate coating film, a base coating film, and a clear coating film. The intermediate coating film, base coating film, and clear coating film each can consist of one layer or two or more layers.

The multilayer coating film of the present invention preferably comprises an intermediate coating film disposed under the effect base coating film.

Intermediate Coating Film

The intermediate coating film usually contains a resin component, a color pigment, and an extender pigment, and is formed by applying an intermediate paint (V) and preferably drying the paint.

From the standpoint of obtaining a multilayer coating film with a high chroma and lightness in the highlight and maintaining a high chroma in the range from the face to the bottom, the intermediate coating film preferably has lightness of an L*45 of 60 or more, more preferably 65 or more, and even more preferably 70 or more.

L*45 represents the lightness of the intermediate coating film when light illuminated at an incident angle of 45 degrees is received at a light-receiving angle of 45 degrees deviated from specular reflection light to the side closer to the incident light. L*45 is defined as a numerical value of lightness calculated from a spectral reflectance measured using a multi-angle spectrophotometer (trade name: MA-68II, produced by X-Rite Inc.) when light illuminated at an incident angle of 45 degrees is received at a light-receiving angle of 45 degrees deviated from specular reflection light to the side closer to the incident light.

From the standpoint of obtaining a multilayer coating film with a high chroma and lightness in the highlight and maintaining a high chroma in the range from the face to the bottom, the intermediate coating film preferably has a thickness of 10 to 60 µm more preferably 20 to 50 µm, and particularly preferably 25 to 45 µm, on a dry film basis.

The intermediate paint (V) is preferably a paint containing a resin component, a color pigment, an extender pigment, and a medium comprising water and/or an organic solvent. The resin component typically contains a base resin and a curing agent. The resin component for use may be known resins or compounds commonly used in the art. Examples of base resins include acrylic resins, polyester resins, epoxy resins, and polyurethane resins. Examples of curing agents include amino resins, polyisocyanate compounds, and blocked polyisocyanate compounds.

The intermediate paint (V) may be an aqueous paint or a solvent-based paint. From the standpoint of decreasing VOCs of paint, the intermediate paint is preferably an aqueous paint. When the colored base paint is an aqueous paint, the base resin for use can be a resin that contains hydrophilic groups (e.g., a carboxyl group, a hydroxyl group, a methylol group, an amino group, a sulfonate group, and a polyoxyethylene group; and most preferably a carboxyl group) in an amount sufficient to solubilize or disperse the resin in water. By neutralizing the hydrophilic groups, the base resin can be solubilized or dispersed in water.

Examples of the color pigments include titanium oxide, zinc oxide, carbon black, molybdenum red, Prussian blue, cobalt blue, azo-based pigments, phthalocyanine-based pigments, quinacridone-based pigments, isoindoline-based pigments, threne-based pigments, perylene-based pigments, dioxazine-based pigments, diketopyrrolopyrrole-based pigments, and the like. Among these, titanium oxide and carbon black can be preferably used.

From the standpoint of obtaining a multilayer coating film with a high chroma and lightness in the highlight and maintaining a high chroma in the range from the face to the bottom, the content of the color pigment is preferably 30 to 170 parts by mass, and more preferably 50 to 150 parts by mass, on a solids basis, based on 100 parts by mass of the resin solids content of the intermediate paint (V).

Examples of the extender pigments include clay, kaolin, barium sulfate, barium carbonate, calcium carbonate, talc, silica, alumina white, and the like. Among these, barium sulfate and/or talc is preferably used.

The content of the extender pigment is preferably 1 to 20 parts by mass, and more preferably 3 to 15 parts by mass, based on 100 parts by mass of the resin solids content of the intermediate paint (V).

The intermediate coating film (V) contains a resin component, a color pigment, and an extender pigment as described above, and may optionally further contain an ultraviolet absorber, a light stabilizer, an antifoaming agent, a thickener, an organic solvent, a surface adjusting agent, and a pigment other than the color pigment and the extender pigment.

The intermediate paint (V) can be applied by a usual method. Examples include air-spray coating, airless spray coating, rotary-atomization coating, and like methods. When the intermediate paint (V) is applied, electrostatic charge may be applied, if necessary. In particular, rotary-atomization electrostatic coating and air-spray electrostatic coating are preferable, with rotary-atomization electrostatic coating being particularly preferable.

When air-spray coating, airless spray coating, or rotary-atomization coating is performed, it is preferred that the intermediate paint (V) be adjusted to have a solids content and a viscosity suitable for coating by adding water and/or an organic solvent, and optional additives such as a rheology control agent and an antifoaming agent.

The intermediate paint (V) has a solids content of 10 to 65 mass %, preferably 15 to 55 mass %, and even more preferably 20 to 50 mass %. The intermediate paint (V) has a viscosity of preferably 200 to 7000 cps, more preferably 300 to 6000 cps, and even more preferably 500 to 5000 cps, as measured with a Brookfield viscometer at 20° C. and at 6 rpm.

The multilayer coating film further comprises a clear coating film on the colored base coating film.

Clear Coating Film

The clear coating film is usually formed by applying a clear coating paint (Z) and preferably drying the paint. The clear paint (Z) may be a one-component clear paint containing a base resin and a curing agent, or a two-component clear paint comprising a hydroxy-containing resin and a polyisocyanate compound.

Examples of combinations of a base resin and a curing agent in the one-component clear paint include a carboxy-containing resin and an epoxy-containing resin, a hydroxy-containing resin and a blocked polyisocyanate compound, a hydroxy-containing resin and a melamine resin, and the like.

From the standpoint of obtaining a multilayer coating film with excellent adhesion and pearly or metallic luster, the clear paint (Z) is preferably a two-component clear paint comprising a hydroxy-containing resin and an isocyanate group-containing compound.

The hydroxy-containing resin for use may be a known resin that has a hydroxyl group, without any limitation. Examples of hydroxy-containing resins include hydroxy-containing acrylic resins, hydroxy-containing polyester resins, hydroxy-containing polyether resins, hydroxy-containing polyurethane resins, and the like; preferably hydroxy-containing acrylic resins and hydroxy-containing polyester resins; and particularly preferably hydroxy-containing acrylic resins.

The hydroxy value of the hydroxy-containing acrylic resin is preferably within the range of 80 to 200 mgKOH/g, and more preferably 100 to 180 mgKOH/g. When the hydroxy value is 80 mgKOH/g or more, the crosslinking density is high, and thus the scratch resistance is sufficient. When the hydroxy value is 200 mgKOH/g or less, the coating film has satisfactory water resistance.

The weight average molecular weight of the hydroxy-containing acrylic resin is preferably within the range of 2500 to 40000, and more preferably 5000 to 30000. When the weight average molecular weight is 2500 or more, the coating film performance, such as acid resistance, is satisfied. When the weight average molecular weight is 40000 or less, the smoothness of the coating film is sufficient, and thus the finish is satisfied.

In the present specification, the weight average molecular weight refers to a value calculated from a chromatogram measured by gel permeation chromatography based on the molecular weight of standard polystyrene. For the gel permeation chromatography, HLC8120GPC (produced by Tosoh Corporation) was used. The measurement was conducted using four columns: TSKgel G-4000HXL, TSKgel G-3000HXL, TSKgel G-2500HXL, and TSKgel G-2000HXL (trade names, all produced by Tosoh Corporation) under the following conditions: mobile phase: tetrahydrofuran; measuring temperature: 40° C.; flow rate: 1 cc/min; detector: RI.

The glass transition temperature of the hydroxy-containing acrylic resin is −40° C. to 20° C., and particularly preferably −30° C. to 10° C. When the glass transition temperature is −40° C. or more, the coating film hardness is sufficient. When the glass transition temperature is 20° C. or less, the obtained coating film has satisfactory coating surface smoothness.

A polyisocyanate compound is a compound having at least two isocyanate groups per molecule. Examples include aliphatic polyisocyanates, alicyclic polyisocyanates, aromatic-aliphatic polyisocyanates, aromatic polyisocyanates, derivatives of these polyisocyanates, and the like. Such polyisocyanate compounds can be used singly or in a combination of two or more.

When the clear paint (Z) for use is a two-component clear paint, the equivalent ratio of the isocyanate groups in the polyisocyanate compound to the hydroxyl groups in the hydroxy-containing resin (NCO/OH) is preferably 0.5 to 2.0, and more preferably 0.8 to 1.5, from the standpoint of, for example, curability and scratch resistance of the coating film.

The clear paint (z) may further optionally contain solvents such as water and organic solvents, and additives for paints, such as curing catalysts, antifoaming agents, ultraviolet absorbers, light stabilizers, thickeners, surface adjusting agents, and pigments.

The form of the clear paint (Z) is not particularly limited. The clear paint for use is typically an organic solvent-based paint composition. Examples of organic solvents for use in this case include various organic solvents for paints, such as aromatic or aliphatic hydrocarbon solvents, ester solvents, ketone solvents, and ether solvents. The organic solvent for use may be the solvent used in the preparation of, for example, the hydroxy-containing resin, or other organic solvents may be further added.

The clear paint (Z) has a solids concentration of preferably about 30 to 70 mass %, and more preferably about 40 to 60 mass %.

The clear paint (Z) can be applied, for example, by a coating method, without any particular limitation, such as air spray coating, airless spray coating, rotary-atomization coating, or curtain coating. In these coating methods, electrostatic charge may be applied, if necessary. Of these methods, rotary-atomization coating using electrostatic charge is preferable. The amount of the clear paint (Z) applied is preferably an amount that results in a cured film thickness of about 10 to 50 μm.

Moreover, when the clear paint (Z) is applied, it is preferable to appropriately adjust the viscosity of the clear paint (Z) within a viscosity range suitable for the coating method. For example, for rotary atomization coating using an electrostatic charge, it is preferable to appropriately adjust the viscosity of the clear paint (Z) within a range of about 15 to 60 seconds as measured with a Ford cup No. 4 viscometer at 20° C. using a solvent, such as an organic solvent.

The method for forming a multilayer coating film according to the present invention comprises the following steps (1) to (3) as described above:

step (1) of applying an effect base paint (X) to a substrate to form an effect base coating film;

step (2) of applying a colored base paint (Y) to the effect base coating film to form a colored base coating film; and step (3) of separately or concurrently heating the effect base coating film formed in step (1) and the colored base coating film formed in step (2) to cure the coating films.

Other preferred embodiments of methods for forming the multilayer coating film of the present invention include, for example, the following methods (A) to (C).

Method (A)

A method for forming the multilayer coating film comprising the following steps (A1) to (A4):

step (A1): step of applying an intermediate paint (V) to a substrate to form an intermediate coating film with an L*45 of 60 or more;

step (A2) of applying an effect base paint (X) to the intermediate coating film to form an effect base coating film;

step (A3) of applying a colored base paint (Y) to the effect base coating film to form a colored base coating film; and step (A4) of separately or concurrently heating the intermediate coating film formed in step (A1), the effect base coating film formed in step (A2), and the colored base coating film formed in step (A3) to cure the coating films.

Method (B)

A method for forming the multilayer coating film comprising the following steps (B1) to (B4):

step (B1) of applying an effect base paint (X) to a substrate to form an effect base coating film;

step (B2) of applying a colored base paint (Y) to the effect base coating film to form a colored base coating film;

step (B3) of applying a clear paint (Z) to the colored base coating film to form a clear coating film; and step (B4) of separately or concurrently heating the effect base coating film formed in step (B1), the colored base coating film formed in step (B2), and the clear coating film formed in step (B3) to cure the coating films.

Method (C)

A method for forming the multilayer coating film comprising the following steps (C1) to (C5):

step (C1): step of applying an intermediate paint (V) to a substrate to form an intermediate coating film having an L*45 of 60 or more;

step (C2) of applying an effect base paint (X) to the intermediate coating film to form an effect base coating film;

step (C3) of applying a colored base paint (Y) to the effect base coating film to form a colored base coating film;

step (C4) of applying a clear paint (Z) to the colored base coating film to form a clear coating film; and step (C5) of separately or concurrently heating the intermediate coating film formed in step (C1), the effect base coating film formed in step (C2), the colored base coating film formed in step (C3), and the clear coating film formed in step (C4) to cure the coating films.

Examples of the substrate include exterior panel parts of vehicle bodies, such as passenger cars, trucks, motorcycles, and buses; vehicle components; exterior panel parts of electric household appliances, such as mobile phones, and audio equipment; and the like. Among these, exterior panel parts of vehicle bodies and vehicle components are preferable.

The material for these substrates is not particularly limited. Examples of the material include metallic materials, such as iron, aluminum, brass, copper, tin, stainless steel, galvanized steel, and steel plated with zinc alloys (e.g., Zn—Al, Zn—Ni, Zn—Fe); plastic materials, such as various types of fiber-reinforced plastics (FRP), polyethylene resins, polypropylene resins, acrylonitrile-butadiene-styrene (ABS) resins, polyamide resins, acrylic resins, vinylidene chloride resins, polycarbonate resins, polyurethane resins, epoxy resins, and like resins; inorganic materials, such as glass, cement, and concrete; wood; textile materials, such as paper and cloth; and the like. Among these materials, metallic materials and plastic materials are preferable.

The substrate surface to which the multilayer coating film is applied also includes exterior panel parts of vehicle bodies, vehicle components, electric household appliances, or metal substrates of these, such as steel plates, whose metal surfaces may be subjected to a surface treatment, such as phosphate treatment, chromate treatment, or composite oxide treatment.

One or more coating films may be further formed on the object that may or may not be surface-treated. For example, the substrate as a base material may be surface-treated, if necessary, and an undercoating film may be formed on it. For example, when the substrate is a vehicle body, the undercoating film can be formed by using a known undercoat paint commonly used in the coating of vehicle bodies.

Examples of the undercoat paint composition for forming the undercoating film include electrodeposition paints, and preferably cationic electrodeposition paints. Examples of usable intermediate paints for forming the intermediate coating film include paints prepared using a base resin, such as an acrylic resin, polyester resin, alkyd resin, urethane resin, or epoxy resin that contain a crosslinkable functional group, such as a carboxyl group or a hydroxyl group; an amino resin, such as melamine resin or urea resin; and a crosslinking agent, such as a blocked or unblocked polyisocyanate compound, together with a pigment, a thickener, and other optional components.

In the present specification, the meaning of "applying an effect base paint (X) to a substrate" or "applying an intermediate paint (V) to a substrate" includes not only the case of directly applying the effect base paint (X) or the intermediate paint (V) to a substrate, but also the case of applying the effect base paint (X) or the intermediate paint (V) after a substrate is surface-treated and/or one or more additional layers, such as an undercoating film, are formed on the substrate.

In the method of forming a multilayer coating film according to the present invention, the colored base coating film, effect base coating film, intermediate coating film and/or clear coating films formed in the steps are heated to separately or simultaneously cure these coating films.

Heating can be performed by a known means. For example, a drying furnace, such as a hot-blast stove, an electric furnace, or an infrared beam heating furnace, can be used. The heating temperature is preferably within the range of 70 to 150° C., and more preferably 80 to 140° C. The heating time is not particularly limited; however, it is preferably within the range of 10 to 40 minutes, and more preferably 20 to 30 minutes.

The present invention may also have the following configurations.

[1] A multilayer coating film comprising an effect base coating film and a colored base coating film formed on the effect base coating film, wherein when $X=[(C^*45)^2+(C^*75)^2]^{1/2}$ and $Y=[(L^*15)^2+(C^*15)^2]^{1/2}+[(L^*25)^2+(C^*25)^2]^{1/2}$, X is 80 or more, and Y is 145 or more (wherein C*15, C*25, C*45, and C*75 represent chroma values of the multilayer coating film when light illuminated at an incident angle of 45 degrees is received at light-receiving angles of 15 degrees, 25 degrees, 45 degrees, and 75 degrees deviated from specular reflection light to the side closer to the incident light, and L*15 and L*25 represent lightness values of the multilayer coating film when light illuminated at an incident angle of 45 degrees is received at light-receiving angles of 15 degrees and 25 degrees deviated from specular reflection light to the side closer to the incident light).

[2] The multilayer coating film according to [1], wherein X is more than 80.

[3] The multilayer coating film according to [1], wherein X is 85 or more.

[4] The multilayer coating film according to any one of [1] to [3], wherein X is 130 or less.

[5] The multilayer coating film according to any one of [1] to [3], wherein X is 120 or less.

[6] The multilayer coating film according to any one of [1] to [5], wherein X is 150 or more.

[7] The multilayer coating film according to any one of [1] to [5], wherein X is 160 or more.

[8] The multilayer coating film according to any one of [1] to [7], wherein X is 210 or less.

[9] The multilayer coating film according to any one of [1] to [7], wherein Y is 200 or less.

[10] The multilayer coating film according to any one of [1] to [7], wherein Y is 190 or less.

[11] The multilayer coating film according to any one of [1] to [10], wherein the multilayer coating film has a graininess of 60 or less as measured (in terms of HG value).

[12] The multilayer coating film according to any one of [1] to [11], wherein the effect base coating film contains an effect pigment in an amount of 3 to 75 parts by mass, on a solids basis, based on 100 parts by mass of the effect base coating film.

[13] The multilayer coating film according to any one of [1] to [12], wherein the effect base coating film contains a color pigment in an amount of 40 parts by mass or less, on a solids basis, based on 100 parts by mass of the effect base coating film.

[14] The multilayer coating film according to [12], wherein the effect pigment contains a light interference pigment, a vapor-deposited metal flake pigment, an aluminum flake pigment, or a combination thereof.

[15] The multilayer coating film according to [13], wherein the effect pigment comprises a light interference pigment.

[16] The multilayer coating film according to [14] or [15], wherein the light interference pigment comprises a titanium oxide-coated alumina flake pigment or artificial mica.

[17] The multilayer coating film according to any one of [1] to [16], wherein the effect base coating film further contains a surface adjusting agent.

[18] The multilayer coating film according to [17], wherein the surface adjusting agent comprises at least one member selected from the group consisting of silicone-based surface adjusting agents, acrylic-based surface adjusting agents, vinyl-based surface adjusting agents, fluorine-based surface adjusting agents, and acetylenediol-based surface adjusting agents.

[19] The multilayer coating film according to any one of [1] to [18], wherein the effect base coating film further comprises a rheology control agent.

[20] The multilayer coating film according to [19], wherein the rheology control agent comprises a cellulose-based rheology control agent.

[21] The multilayer coating film according to any one of [1] to [20], wherein the colored base coating film comprises 0.1 to 10 parts by mass of a color pigment on a solids basis, based on 100 parts by mass of the colored base coating film.

[22] The multilayer coating film according to any one of [1] to [21], further comprising an intermediate coating film disposed under the effect base coating film, the intermediate coating film having an L*45 of 60 or more (wherein L*45 represents a lightness value of the intermediate coating film when light illuminated at an incident angle of 45 degrees is received at a light-receiving angle of 45 degrees deviated from specular reflection light to the side closer to the incident light).

[23] The multilayer coating film according to any one of [1] to [22], further comprising a clear coating film on the colored base coating film.

[24] The multilayer coating film according to any one of [1] to [23], wherein the effect base coating film has a film thickness of 0.2 to 4.5 μm.

[25] The multilayer coating film according to any one of [1] to [24], wherein the colored base coating film has a film thickness of 5 to 40 μm.

[26] An object comprising the multilayer coating film of any one of [1] to [25].

[27] A method for forming a multilayer coating film comprising the following steps (1) to (3):
　step (1) of applying an effect base paint (X) to a substrate to form an effect base coating film;
　step (2) of applying a colored base paint (Y) to the effect base coating film to form a colored base coating film; and
　step (3) of separately or concurrently heating the effect base coating film formed in step (1) and the colored base coating film formed in step (2) to cure the coating films,
　wherein the multilayer coating film satisfies the following conditions: when $X=[(C^*45)^2+(C^*75)^2]^{1/2}$ and $Y=[(L^*15)^2+(C^*15)^2]^{1/2}+[(L^*25)^2+(C^*25)^2]^{1/2}$, X is 80 or more and Y is 145 or more (wherein C*15, C*25, C*45, and C*75 represent chroma values when light illuminated at an incident angle of 45 degrees is received at light-receiving angles of 15 degrees, 25 degrees, 45 degrees, and 75 degrees deviated from specular reflection light to the side closer to the incident light; and L*15 and L*25 represent lightness values of the multilayer coating film when light illuminated at an incident angle of 45 degrees is received at light-receiving angles of 15 degrees and 25 degrees deviated by from the specular reflection light to the side closer to the incident light).

[28] The method according to [27], wherein X is more than 80.

[29] The method according to [27], wherein X is 85 or more.

[30] The method according to any one of [27] to [29], wherein X is 130 or less.

[31] The method according to any one of [27] to [29], wherein X is 120 or less.

[32] The method according to any one of [27] to [31], wherein Y is 150 or more.

[33] The method according to any one of [27] to [31], wherein Y is 160 or more.

[34] The method according to any one of [27] to [33], wherein Y is 210 or less.

[35] The method according to any one of [27] to [33], wherein Y is 200 or less.

[36] The method according to any one of [27] to [33], wherein Y is 190 or less.

[37] The multilayer coating film according to any one of [27] to [36], wherein the effect base paint (X) contains water, an effect pigment, a surface adjusting agent, and a rheology control agent.
[38] The method for forming a multilayer coating film according to any one of [27] to [37], wherein the effect base paint (X) contains an effect pigment in an amount of 3 to 75 parts by mass on a solids basis, based on 100 parts by mass of the effect base coating film on a solids basis.
[39] The method according to any one of [27] to [38], wherein the effect base paint contains a color pigment in an amount of 40 parts by mass or less on a solids basis, based on 100 parts by mass of the effect base paint (X) on a solids basis.
[40] The method according to [37] or [38], wherein the effect pigment contains a light interference pigment, a vapor-deposited metal flake pigment, an aluminum flake pigment, or a combination thereof.
[41] The method according to [40], wherein the effect pigment comprises a light interference pigment.
[42] The method according to [40] or [41], wherein the light interference pigment comprises a titanium oxide-coated alumina flake pigment or artificial mica.
[43] The method according to any one of [27] to [42], wherein the effect base coating film further contains a surface adjusting agent.
[44] The method according to [43], wherein the surface adjusting agent comprises at least one member selected from the group consisting of silicone-based surface adjusting agents, acrylic-based surface adjusting agents, vinyl-based surface adjusting agents, fluorine-based surface adjusting agents, and acetylenediol-based surface adjusting agents.
[45] The method according to any one of [27] to [44], wherein the effect base coating film further comprises a rheology control agent.
[46] The method according to [45], wherein the rheology control agent comprises a cellulose-based rheology control agent.
[47] The method according to any one of [27] to [46], wherein the colored base coating film contains a color pigment in an amount of 0.1 to 10 parts by mass on a solids basis, based on 100 parts by mass of the colored base paint on a solids basis.
[48] The method according to any one of [27] to [47], wherein the multilayer coating film further comprises an intermediate coating film disposed under the effect base coating film, the intermediate coating film having an L*45 of 60 or more (wherein L*45 represents a lightness value of the intermediate coating film when light illuminated at an incident angle of 45 degrees is received at a light-receiving angle of 45 degrees deviated from specular reflection light to the side closer to the incident light).
[49] The method according to any one of [27] to [48], wherein the multilayer coating film further comprises a clear coating film on the colored base coating film.
[50] The method according to any one of [27] to [49], wherein the effect base coating film has a thickness of 0.2 to 4.5 µm on a dry film basis.
[51] The method according to any one of [27] to [50], wherein the colored base coating film has a thickness of 5 to 40 µm on a cured film basis.

EXAMPLES

The present invention is described below more specifically with reference to Examples and Comparative Examples. However, the present invention is not limited to these Examples. "Parts" and "%" are on a mass basis.

Production of Acrylic Resin Aqueous Dispersion (R-1)

Production Example 1

128 parts of deionized water and 2 parts of Adekaria Soap SR-1025 (trade name, produced by Adeka Corporation, an emulsifier, active ingredient: 25%) were placed in a reaction vessel equipped with a thermometer, a thermostat, a stirrer, a reflux condenser, a nitrogen inlet tube, and a dropping funnel, and mixed with stirring in a nitrogen stream, and then heated to 80° C.

Subsequently, 1% of the entire amount of a monomer emulsion for the core, described below, and 5.3 parts of a 6% ammonium persulfate aqueous solution were added to the reaction vessel and maintained at 80° C. for 15 minutes. Thereafter, the remaining monomer emulsion for the core was added dropwise over a period of 3 hours to the reaction vessel maintained at the same temperature. After the completion of dropwise addition, the mixture was aged for 1 hour. Subsequently, a monomer emulsion for the shell, described below, was added dropwise over a period of 1 hour, and the mixture was aged for 1 hour, followed by cooling to 30° C., while 40 parts of a 5% 2-(dimethylamino) ethanol aqueous solution was gradually added to the reaction vessel. The mixture was filtered with a 100-mesh nylon cloth for discharge, thereby obtaining an acrylic resin aqueous dispersion (R-1) with an average particle size of 100 nm and a solids content of 30%. The obtained acrylic resin aqueous dispersion had an acid value of 33 mg KOH/g and a hydroxy value of 25 mg KOH/g.

Monomer emulsion for the core: 40 parts of deionized water, 2.8 parts of Adekaria Soap SR-1025, 2.1 parts of methylene bisacrylamide, 2.8 parts of styrene, 16.1 parts of methyl methacrylate, 28 parts of ethyl acrylate, and 21 parts of n-butyl acrylate were mixed with stirring, thereby obtaining a monomer emulsion for the core.

Monomer emulsion for the shell: 17 parts of deionized water, 1.2 parts of Adekaria Soap SR-1025, 0.03 parts of ammonium persulfate, 3 parts of styrene, 5.1 parts of 2-hydroxyethyl acrylate, 5.1 parts of methacrylic acid, 6 parts of methyl methacrylate, 1.8 parts of ethyl acrylate, and 9 parts of n-butyl acrylate were mixed with stirring, thereby obtaining a monomer emulsion for the shell.

Production of Acrylic Resin Solution (R-2)

Production Example 2

35 parts of propylene glycol monopropyl ether was placed into a reaction vessel equipped with a thermometer, a thermostat, a stirrer, a reflux condenser, a nitrogen inlet tube, and a dropping funnel, and heated to 85° C. Subsequently, a mixture comprising 30 parts of methyl methacrylate, 20 parts of 2-ethylhexyl acrylate, 29 parts of n-butyl acrylate, 15 parts of 2-hydroxyethyl acrylate, 6 parts of acrylic acid, 15 parts of propylene glycol monopropyl ether, and 2.3 parts of 2,2'-azobis(2,4-dimethylvaleronitrile) was added dropwise thereto over a period of 4 hours. After completion of the dropwise addition, the mixture was aged for 1 hour. Subsequently, a mixture of 10 parts of propylene glycol monopropyl ether and 1 part of 2,2'-azobis(2,4-dimethylvaleronitrile) was further added dropwise thereto over a period of 1 hour. After completion of the dropwise addition, the mixture was aged for 1 hour. 7.4 parts of diethanolamine was further added thereto, thereby obtaining an acrylic resin solution (R-2) with a solids content of 55%. The obtained hydroxy-containing acrylic resin had an acid value of 47 mg KOH/g, a hydroxy value of 72 mg KOH/g, and a weight average molecular weight of 58000.

Production of Polyester Resin Solution (R-3)

Production Example 3

109 parts of trimethylolpropane, 141 parts of 1,6-hexanediol, 126 parts of 1,2-cyclohexanedicarboxylic anhydride, and 120 parts of adipic acid were placed into a reaction vessel equipped with a thermometer, a thermostat, a stirrer, a reflux condenser, and a water separator. The mixture was heated from 160° C. to 230° C. over a period of 3 hours, followed by a condensation reaction at 230° C. for 4 hours. Subsequently, to introduce a carboxyl group to the obtained condensation reaction product, 38.3 parts of trimellitic anhydride was added to the product, followed by a reaction at 170° C. for 30 minutes. Thereafter, the product was diluted with 2-ethyl-1-hexanol, thereby obtaining a polyester resin solution (R-3) with a solids content of 70%. The obtained hydroxy-containing polyester resin had an acid value of 46 mg KOH/g, a hydroxy value of 150 mg KOH/g, and a number average molecular weight of 1400.

Production of Extender Pigment Dispersion (P-1)

Production Example 4

327 parts (solids content: 180 parts) of the acrylic resin solution (R-2), 360 parts of deionized water, 6 parts of Surfynol 104A (trade name, produced by Air Products, an antifoaming agent, solids content: 50%), and 250 parts of Barifine BF-20 (trade name, produced by Sakai Chemical Industry Co., Ltd., barium sulfate powder, average particle size: 0.03 μm) were placed in a paint conditioner, and a glass bead medium was added thereto. The mixture was mixed and dispersed at room temperature for 1 hour, thereby obtaining an extender pigment dispersion (P-1) with a solids content of 44%.

Preparation of Red Pigment Dispersion (P-2)

Production Example 5

182 parts of the acrylic resin solution (R-2) (100 parts on a solids basis), 150 parts of Maroon 179 229-6438 (trade name, produced by Sun Chemical Corporation, an organic perylene pigment), and 479 parts of deionized water were mixed. After 2-amino-2-methyl-1-propanol was added to adjust the pH to 7.5, the mixture was dispersed with a paint shaker for 2 hours to obtain a red pigment dispersion (P-2) with a solids content of 30.6%.

Preparation of Transparent Base Paint (W-1)

Production Example 6

14 parts (on a solids basis) of the extender pigment dispersion (P-1), 40 parts (on a solids basis) of the acrylic resin aqueous dispersion (R-1), 23 parts (on a solids basis) of the polyester resin solution (R-3), 10 parts (on a solids basis) of U-COAT UX-310 (trade name, produced by Sanyo Chemical Industries, Ltd., a urethane resin aqueous dispersion, solids content: 40%), and 27 parts (on a solids basis) of Cymel 251 (trade name, produced by Nihon Cytec Industries Inc., melamine resin, solids content: 80%) were placed in a stirring vessel. The resulting mixture was stirred and mixed, thereby preparing a transparent base paint (W-1).

Production of Effect Pigment Dispersion (X)

Production Example 7

76.8 parts of distilled water, 18.4 parts (solids content: 0.4 parts) of a rheology control agent (A-1), 2.1 parts (solids content: 2.1 parts) of an effect pigment (B-1), 1.6 parts (solids content: 0.4 parts) of the acrylic resin aqueous dispersion (R-1), 1.6 parts (solids content: 0.4 parts) of a surface adjusting agent (C-1), 0.2 parts of a UV absorber (D-1) (solids content: 0.1 parts), 0.2 parts of a light stabilizer (E-1) (solids content: 0.1 parts), 0.01 parts of dimethylethanolamine, 0.5 parts of ethylene glycol monobutyl ether were placed in a stirring vessel. The resulting mixture was stirred and mixed, thereby preparing an effect base paint (X-1).

The rheology control agent (A-1), the effect pigment (B-1), the surface adjusting agent (C-1), the ultraviolet absorber (D-1), and the light stabilizer (E-1) are as follows.

(A-1) Rheocrysta: trade name, produced by DKS Co., Ltd., cellulose nanofibers, solids content: 2%;
(B-1) Xirallic T61-10 Micro Silver: trade name, produced by Merck & Co., Inc., a titanium oxide-coated alumina flake pigment, solids content: 100%;
(C-1) Dynol 604 (trade name, produced by Evonik Industries, an acetylenic diol-based surface adjusting agent, solids content: 100%);
(D-1) Tinuvin 479-DW (N) (trade name, produced by BASF, an UV absorber, solids content: 40%); and
(E-1) Tinuvin 123-DW (N) (trade name, produced by BASF, a light stabilizer, solids content: 50%).

Production Examples 8 to 18

Effect base paints (X-2) to (X-12) were obtained in the same manner as in Production Example 7, except that the formulations shown in Table 1 were used.

The following are components shown in Table 1.

(A-2): Acrysol ASE-60 (trade name, produced by Dow Chemical Co., Ltd., a polyacrylic acid-based rheology control agent, solids content: 28%)
(B-2): Xirallic T60-10 Crystal Silver (trade name, produced by Merck & Co., Inc., a titanium oxide-coated alumina flake pigment, solids content: 100%)
(B-3): TWINCLEPEARL SXC-SO (trade name, produced by Nihon Koken Kogyo Co., Ltd., an artificial mica interference silver pearl pigment, solids content: 100%)
(B-4) Hydroshine WS-3004 (trade name, produced by Eckart, an aqueous vapor deposition aluminum flake pigment, solids content: 10.0%)
(B-5) Alpaste EMR-B6270: trade name, produced by Toyo Aluminium K.K., an aluminum flake pigment, solids content: 60.0%)
(C-2) BYK348 (trade name, produced by BYK, a silicone-based surface adjusting agent, solids content: 100%)

TABLE 1

| Production Example No. | | | 7 | 8 | 9 | 10 | 11 | 12 |
|---|---|---|---|---|---|---|---|---|
| Name of effect base paint (X) | | | X-1 | X-2 | X-3 | X-4 | X-5 | X-6 |
| Formulation | Distilled water | | 76.8 | 75.9 | 76.0 | 77.1 | 77.4 | 74.9 |
| | Rheology control agent | A-1 | 18.4 | 18.1 | 18.2 | 18.6 | 18.7 | 18.2 |
| | | A-2 | | | | | | |

TABLE 1-continued

|  |  |  |  |  |  |  |  |  |
|---|---|---|---|---|---|---|---|---|
|  | Effect pigment | B-1 | 2.1 |  |  |  |  | 2.1 |
|  |  | B-2 |  | 2.3 |  |  |  |  |
|  |  | B-3 |  |  | 2.1 |  |  |  |
|  |  | B-4 |  |  |  | 1.5 | 0.7 |  |
|  |  | B-5 |  |  |  |  | 0.4 |  |
|  | Red pigment dispersion | P-2 |  |  |  |  |  | 3.7 |
|  | Acrylic resin aqueous dispersion | R-1 | 1.6 | 1.6 | 1.6 | 1.7 | 1.7 |  |
|  | Surface adjusting agent | C-1 | 0.2 | 0.2 | 0.2 | 0.2 | 0.2 | 0.2 |
|  |  | C-2 |  |  |  |  |  |  |
|  | Ultraviolet absorber | D-1 | 0.2 | 0.2 | 0.2 | 0.2 | 0.2 | 0.2 |
|  | Light stabilizer | E-1 | 0.2 | 0.2 | 0.2 | 0.2 | 0.2 | 0.2 |
|  | Dimethyl ethanolamine |  | 0.01 | 0.01 | 0.01 | 0.01 | 0.01 | 0.01 |
|  | Ethylene glycol monobutyl ether |  | 0.5 | 0.5 | 0.5 | 0.5 | 0.5 | 0.5 |
| Properties | Solid content (%) |  | 3.3 | 4.6 | 4.3 | 1.4 | 1.5 | 4.0 |
|  | Paint viscosity B60 value (mPa · s) |  | 452 | 463 | 461 | 485 | 476 | 421 |
|  | Amount of effect pigment based on 100 parts by mass of the effect base paint (X) on a solids basis (parts by mass) |  | 63.7 | 73.5 | 72.2 | 10.9 | 20.1 | 52.8 |
|  | Amount of effect pigment based on 100 parts by mass the total amount of the effect base paint (X) (parts by mass) |  | 2.1 | 3.3 | 3.1 | 0.2 | 0.3 | 2.1 |

|  | Production Example No. |  | 13 | 14 | 15 | 16 | 17 | 18 |
|---|---|---|---|---|---|---|---|---|
|  | Name of effect base paint (X) |  | X-7 | X-8 | X-9 | X-10 | X-11 | X-12 |
| Formulation | Distilled water |  | 75.3 | 75.8 | 76.4 | 76.0 | 84.1 | 76.8 |
|  | Rheology control agent | A-1 | 18.3 | 18.3 | 18.3 | 18.2 | 9.1 | 18.4 |
|  |  | A-2 |  |  |  |  | 1.1 |  |
|  | Effect pigment | B-1 | 2.1 | 2.1 | 2.1 | 3.1 | 2.1 | 2.1 |
|  |  | B-2 |  |  |  |  |  |  |
|  |  | B-3 |  |  |  |  |  |  |
|  |  | B-4 |  |  |  |  |  |  |
|  |  | B-5 |  |  |  |  |  |  |
|  | Red pigment dispersion | P-2 | 2.8 | 1.9 | 0.9 |  |  |  |
|  | Acrylic resin aqueous dispersion | R-1 | 0.4 | 0.8 | 1.2 | 1.6 | 2.2 | 1.6 |
|  | Surface adjusting agent | C-1 | 0.2 | 0.2 | 0.2 | 0.2 | 0.3 |  |
|  |  | C-2 |  |  |  |  |  | 0.2 |
|  | Ultraviolet absorber | D-1 | 0.2 | 0.2 | 0.2 | 0.2 | 0.3 | 0.2 |
|  | Light stabilizer | E-1 | 0.2 | 0.2 | 0.2 | 0.2 | 0.2 | 0.2 |
|  | Dimethyl ethanoiamine |  | 0.01 | 0.01 | 0.01 | 0.01 | 0.12 | 0.01 |
|  | Ethylene glycol monobutyl ether |  | 0.5 | 0.5 | 0.5 | 0.5 | 0.5 | 0.5 |
| Properties | Solid content (%) |  | 3.8 | 3.7 | 3.5 | 4.3 | 3.8 | 3.3 |
|  | Paint viscosity B60 value (mPa · s) |  | 423 | 425 | 428 | 460 | 395 | 451 |
|  | Amount of effect pigment based on 100 parts by mass of the effect base paint (X) on a solids basis (parts by mass) |  | 55.1 | 57.5 | 60.7 | 72.2 | 56.3 | 63.7 |
|  | Amount of effect pigment based on 100 parts by mass of the total amount of the effect base paint (X) (parts by mass) |  | 2.1 | 2.1 | 2.1 | 3.1 | 2.1 | 2.1 |

Production of Colored Base Paint (Y-1)

Production Example 19

The transparent base paint (W-1) was placed in a stirring vessel. The red pigment dispersion (P-2) was added so that the amount of Maroon 179 229-6438 was 0.78 parts by mass per 100 parts by mass of the resin solids content of the transparent base paint (W-1). The resulting mixture was stirred and mixed, thereby preparing a colored base paint (Y-1).

Production of Colored Base Paint (Y-2)

Production Example 20

The transparent base paint (W-1) was placed in a stirring vessel. The red pigment dispersion (P-2) was added so that the amount of Maroon 179 229-6438 was 1.56 parts by mass per 100 parts by mass of the resin solids content of the transparent base paint (W-1). The resulting mixture was stirred and mixed, thereby preparing a colored base paint (Y-2).

Production of Colored Base Paint (Y-3)

Production Example 21

The transparent base paint (W-1) was placed in a stirring vessel. The red pigment dispersion (P-2) was added so that the amount of Maroon 179 229-6438 was 2.35 parts by mass per 100 parts by mass of the resin solids content of the transparent base paint (W-1). The resulting mixture was stirred and mixed, thereby preparing a colored base paint (Y-3).

Production of Colored Base Paint (Y-4)

Production Example 22

The transparent base paint (W-1) was placed in a stirring vessel. The red pigment dispersion (P-2) was added so that the amount of Maroon 179 229-6438 was 3.23 parts by mass per 100 parts by mass of the resin solids content of the transparent base paint (W-1). The resulting mixture was stirred and mixed, thereby preparing a colored base paint (Y-4).

Production of Colored Base Paint (Y-5)

Production Example 23

The transparent base paint (W-1) was placed in a stirring vessel. The red pigment dispersion (P-2) was added so that the amount of Maroon 179 229-6438 was 4.89 parts by mass per 100 parts by mass of the resin solids content of the transparent base paint (W-1). The resulting mixture was stirred and mixed, thereby preparing a colored base paint (Y-5).

Preparation of Intermediate Paint (V)
Intermediate Paint (V-1)

WP-523H N-8.0 (trade name, produced by Kansai Paint Co., Ltd., an aqueous intermediate paint) was used as an intermediate paint (V-1). The obtained intermediate paint film had a lightness $L*45$ of 80.

The lightness $L*45$ of the intermediate coating film was obtained by measuring the dry coating film using a multi-angle spectrophotometer (trade name: MA-68II, produced by X-Rite Inc.). A cationic electrodeposition paint Elecron 9400HB (trade name, produced by Kansai Paint Co., Ltd., an amine-modified epoxy resin-based cationic resin containing a blocked polyisocyanate compound as a curing agent) was applied by electrodeposition to a degreased and zinc phosphate-treated steel plate (JIS G3141, size: 400×300×0.8 mm) to a film thickness of 20 μm when cured. The resulting film was heated at 170° C. for 20 minutes to be cured by crosslinking. The intermediate paint (V-1) was electrostatically applied to the resulting coated plate by using a rotary-atomization bell coater to a film thickness of 30 μm when cured, and then heated at 140° C. for 30 minutes, thereby obtaining a dry coating film.

Intermediate Paint (V-2)

WP-523H N-5.5 (trade name, produced by Kansai Paint Co., Ltd., an aqueous intermediate paint) was used as an intermediate paint (V-2). The obtained intermediate coating film had a lightness $L*45$ of 55.

Intermediate Paint (V-3)

WP-523H N-8.0 (trade name, produced by Kansai Paint Co., Ltd., an aqueous intermediate paint) and WP-523H N-5.5 (trade name, produced by Kansai Paint Co., Ltd., an aqueous intermediate paint) were stirred and mixed so that the obtained intermediate coating film had a lightness $L*45$ of 70, thus preparing an intermediate paint (V-3).

Intermediate Paint (V-4)

WP-523H N-8.0 (trade name, produced by Kansai Paint Co., Ltd., an aqueous intermediate paint) and WP-523H N-5.5 (trade name, produced by Kansai Paint Co., Ltd., an aqueous intermediate paint) were stirred and mixed so that the obtained intermediate coating film had a lightness $L*45$ of 60, thus preparing an intermediate paint (V-4).

Preparation of Clear Paint (Z)
Clear Paint (Z-1)

KINO6510 (trade name, produced by Kansai Paint Co., Ltd., a hydroxy/isocyanate group-curable acrylic urethane resin-based two-component organic solvent paint) was used as a clear paint (Z-1).

Clear Paint (Z-2)

Magicron TC-69 (trade name, produced by Kansai Paint Co., Ltd., an acrylic and melamine resin-based one-component organic solvent-based paint) was used as a clear paint (Z-2).

Preparation of Substrate

A cationic electrodeposition paint Elecron 9400HB (trade name, produced by Kansai Paint Co., Ltd., an amine-modified epoxy resin-based cationic resin containing a blocked polyisocyanate compound as a curing agent) was applied by electrodeposition to a degreased and zinc phosphate-treated steel plate (JIS G3141, size: 400×300×0.8 mm) to a film thickness of 20 μm when cured. The resulting film was heated at 170° C. for 20 minutes to be cured by crosslinking, thereby obtaining a substrate.

Preparation of Test Plates

Example 1

The intermediate paint (V-1) was electrostatically applied to the substrate to a dry coating film thickness of 30 μm using a Robot Bell (produced by ABB) at a booth temperature of 23° C. and a humidity of 68%. The coating film was allowed to stand for 3 minutes and then preheated at 80° C. for 3 minutes to form an intermediate coating film with a lightness $L*45$ of 80.

Subsequently, the effect base paint (X-1) was adjusted to a paint viscosity shown in Table 1, and electrostatically applied to a dry coating film thickness of 0.7 μm using a Robot Bell (produced by ABB) at a booth temperature of 23° C. and a humidity of 68%.

Subsequently, the colored base paint (Y-1) was electrostatically applied to the effect base coating film to a dry film thickness of 10 μm using a Robot Bell (produced by ABB) at a booth temperature of 23° C. and at a humidity of 68% and then allowed to stand for 3 minutes. The resulting coating was then preheated at 80° C. for 3 minutes to form a colored base coating film.

The clear paint (Z-1) was applied to the colored base coating film to a dry coating film thickness of 35 μm using a Robot Bell (produced by ABB) at a booth temperature of 23° C. and at a humidity of 68% to form a clear coating film.

After the coating, the coated substrate was allowed to stand at room temperature for 7 minutes and then heated in a hot-air-circulation drying oven at 140° C. for 30 minutes to simultaneously dry the multilayer coating film, thereby preparing a test plate.

The film thickness of the dry coating film shown in Table 2 was calculated from the following Equation 3. The same applies to the following Examples.

$$x = (sc*10000)/(S*sg) \quad \text{(Equation 3)}$$

x: film thickness (μm)
sc: coating solids content (g)
S: evaluation area of coating solids content (cm$^2$)
sg: specific gravity of the coating film (g/cm$^3$)

Examples 2 to 17 and Comparative Examples 1 to 3

Test plates were obtained in the same manner as in Example 1, except that the kind of intermediate paint (V), kind and dry film thickness of effect base paint (X), kind and dry film thickness of colored base paint (Y), and kind of clear paint (Z) were changed as shown in Table 2.

The appearance and properties of the coating films of the test plates thus obtained were evaluated. Table 2 shows the results.

Evaluation Method
Calculation of X and Y

Chroma C*15, C*25, C*45, and C*75 in the L*C*h* color space were calculated from spectral reflectances of light illuminated at an angle of 45 degrees with respect to the coating film and received at angles of 15 degrees, 25 degrees, 45 degrees, and 75 degrees deviated from specular reflection light. For the measurement, a multi-angle spectrophotometer (trade name: MA-68II, produced by X-Rite, Inc.) was used.

Lightness L*15 and L*25 in the L*a*b* color space were calculated from spectral reflectances of light illuminated at an angle of 45 degrees with respect to the coating film and received at angles of 15 degrees and 25 degrees deviated from specular reflection light. For the measurement, a multi-angle spectrophotometer (trade name: MA-68II, produced by X-Rite, Inc.) was used.

X and Y were determined in accordance with the following equations. Table 2 shows the values of X and Y of Examples 1 to 17 and Comparative Examples 1 to 3.

$$X = [(C*45)^2 + (C*75)^2]^{1/2}$$

$$Y = [(L*15)^2 + (C*15)^2]^{1/2} + [(L*25)^2 + (C*25)^2]^{1/2}$$

Measurement of Graininess (HG value)

The HG value is an abbreviation of hi-light graininess value. The HG value is one of the scales that represent microscopic brilliance of a microscopically observed coating film surface, and is an index that indicates the graininess in the highlight. The HG value is calculated as follows. First, the surface of a coating film is photographed with a CCD camera at a light incident angle of 15 degrees and a light-receiving angle of 0 degrees, and the obtained digital image data (two-dimensional luminance distribution data) is subjected to two-dimensional Fourier transform to obtain a power spectrum image. Subsequently, from this power spectrum image, only the spatial frequency domain that corresponds to graininess is extracted, and the obtained measured parameter is converted to an HG value from 0 to 100 that has a linear relation with graininess. An HG value of 0 indicates no graininess in an effect pigment, and an HG value of 100 indicates the highest graininess of an effect pigment.

Measurement of Hue Angle h

Table 2 shows hue angle h in the L*C*h color space chromaticity diagram calculated from spectral reflectance of light illuminated at an angle of 45 degrees with respect to the coating film and received at an angle of 45 degrees deviated from specular reflection light to the side closer to the incident light. For the measurement, a multi-angle spectrophotometer (produced by X-Rite, Inc.; trade name MA-68II) was used.

TABLE 2

| | Examples | | | | | | | | | |
|---|---|---|---|---|---|---|---|---|---|---|
| | 1 | 2 | 3 | 4 | 5 | 6 | 7 | 8 | 9 | 10 |
| Name of intermediate coating film (V) | V-1 | V-1 | V-1 | V-1 | V-1 | V-1 | V-1 | V-1 | V-1 | V-1 |
| Lightness of intermediate coating film (L * 45) | 80 | 80 | 80 | 80 | 80 | 80 | 80 | 80 | 80 | 80 |
| Name of effect base paint (X) | X-1 | X-1 | X-1 | X-2 | X-3 | X-4 | X-5 | X-6 | X-7 | X-8 |
| Film thickness of effect base coating film (μm) | 0.7 | 0.7 | 0.7 | 0.8 | 0.9 | 0.5 | 0.5 | 0.9 | 0.8 | 0.8 |
| Name of colored base paint (Y) | Y-2 | Y-4 | Y-5 | Y-4 | Y-4 | Y-4 | Y-4 | Y-4 | Y-1 | Y-2 |
| Film thickness of colored base coating film (μm) | 10 | 10 | 10 | 10 | 10 | 10 | 10 | 10 | 10 | 10 |
| Name of clear paint (Z) | Z-1 | Z-1 | Z-1 | Z-1 | Z-1 | Z-1 | Z-1 | Z-1 | Z-1 | Z-1 |
| C * 15 | 73.6 | 85.7 | 86.8 | 86.5 | 86.3 | 90.5 | 88.3 | 83.6 | 73.9 | 81.9 |
| C * 25 | 64.3 | 73.7 | 73.3 | 71.6 | 71.1 | 74.1 | 72.3 | 69.1 | 68.8 | 74.9 |
| C * 45 | 60.3 | 66.6 | 64.9 | 65.4 | 66.1 | 60.7 | 62.4 | 60.9 | 68.1 | 70.4 |
| C * 75 | 60.9 | 66.4 | 64.2 | 65.9 | 66.3 | 60.1 | 61.9 | 59.9 | 69.4 | 70.4 |
| L * 15 | 52.0 | 40.3 | 36.6 | 41.5 | 41.3 | 44.0 | 42.9 | 34.8 | 46.5 | 41.9 |

TABLE 2-continued

| | | | | | | | | | | |
|---|---|---|---|---|---|---|---|---|---|---|
| L*25 | 41.6 | 32.3 | 29.5 | 31.5 | 31.4 | 33.8 | 32.8 | 26.9 | 37.7 | 35.3 |
| Value X represented by Equation (1) | 86 | 94 | 91 | 93 | 94 | 85 | 88 | 85 | 97 | 100 |
| Value Y represented by Equation (2) | 167 | 175 | 173 | 174 | 173 | 182 | 178 | 165 | 166 | 175 |
| HG value | 31 | 25 | 23 | 56 | 57 | 20 | 35 | 23 | 27 | 28 |
| h value | 30 | 35 | 35 | 34 | 34 | 33 | 33 | 34 | 32 | 34 |

| | Examples | | | | | | | Comparative Examples | | |
|---|---|---|---|---|---|---|---|---|---|---|
| | 11 | 12 | 13 | 14 | 15 | 16 | 17 | 1 | 2 | 3 |
| Name of intermediate coating film (V) | V-1 | V-1 | V-1 | V-1 | V-3 | V-4 | V-1 | V-2 | V-1 | V-4 |
| Lightness of intermediate coating film (L*45) | 80 | 80 | 80 | 80 | 70 | 60 | 80 | 55 | 80 | 60 |
| Name of effect base paint (X) | X-9 | X-10 | X-11 | X-12 | X-1 | X-1 | X-1 | X-1 | X-5 | X-7 |
| Film thickness of effect base coating film (μm) | 0.7 | 0.8 | 0.9 | 0.7 | 0.7 | 0.7 | 0.7 | 0.7 | 0.5 | 0.8 |
| Name of colored base paint (Y) | Y-3 | Y-4 | Y-4 | Y-4 | Y-4 | Y-4 | Y-4 | Y-4 | Y-2 | Y-5 |
| Film thickness of colored base coating film (μm) | 10 | 10 | 10 | 10 | 10 | 10 | 10 | 10 | 10 | 10 |
| Name of clear paint (Z) | Z-1 | Z-1 | Z-1 | Z-1 | Z-1 | Z-1 | Z-2 | Z-1 | Z-1 | Z-1 |
| C*15 | 85.6 | 90.9 | 83.2 | 85.6 | 82.2 | 78.8 | 85.7 | 80.0 | 76.2 | 71.4 |
| C*25 | 76.9 | 80.4 | 71.5 | 73.5 | 70.7 | 67.7 | 73.7 | 61.3 | 63.2 | 62.2 |
| C*45 | 71.3 | 71.4 | 67.3 | 66.5 | 60.2 | 57.4 | 66.6 | 48.1 | 55.8 | 54.6 |
| C*75 | 70.9 | 70.0 | 67.1 | 66.3 | 60.0 | 57.2 | 66.4 | 46.8 | 55.7 | 53.4 |
| L*15 | 40.6 | 42.6 | 39.1 | 40.3 | 38.6 | 37.0 | 40.3 | 37.4 | 53.8 | 31.2 |
| L*25 | 34.0 | 35.7 | 31.3 | 32.8 | 31.0 | 29.7 | 32.3 | 26.1 | 41.3 | 26.6 |
| X value represented by Equation (1) | 101 | 100 | 95 | 94 | 85 | 81 | 94 | 67 | 79 | 76 |
| Y value represented by Equation 2 | 179 | 188 | 170 | 175 | 168 | 161 | 175 | 155 | 169 | 146 |
| HG value | 24 | 30 | 28 | 25 | 26 | 28 | 25 | 38 | 39 | 20 |
| h value | 35 | 35 | 35 | 35 | 34 | 33 | 35 | 32 | 29 | 35 |

The invention claimed is:

1. A multilayer coating film comprising:
an effect base coating film,
a colored base coating film formed on the effect base coating film, and
an intermediate coating film disposed under the effect base coating film, the intermediate coating film having an L*45 of 60 or more,
wherein,
the effect base coating film contains an effect pigment, a surface adjusting agent and a rheology control agent,
the rheology control agent includes cellulose nanofibers,
the effect pigment contains a light interference pigment, a vapor-deposited metal flake pigment, an aluminum flake pigment, or a combination thereof,
the effect base coating film contains the effect pigment in an amount of 3 to 75 parts by mass, on a solids basis, based on 100 parts by mass of the effect base coating film,
the effect base coating film has a film thickness of 0.2 to 4.5 μm,
the colored base coating film contains a resin component and a color pigment,
a cured film thickness of the colored base coating film is 5.0 to 40 μm,
the multilayer coating film has a graininess of 60 or less as measured in terms of HG value,
the multilayer coating film satisfies the following conditions:
wherein when $X=[(C^*45)^2+(C^*75)^2]^{1/2}$ and $Y=[(L^*15)^2+(C^*15)^2]^{1/2}+[(L^*25)^2+(C^*25)^2]^{1/2}$, X is 80 or more and Y is 145 or more, wherein:
C*15, C*25, C*45, and C*75 represent chroma values of the multilayer coating film when light illuminated at an incident angle of 45 degrees is received at light-receiving angles of 15 degrees, 25 degrees, 45 degrees, and 75 degrees deviated from specular reflection light to the side closer to the incident light; and
L*15 and L*25 represent lightness values of the multilayer coating film when light illuminated at an incident angle of 45 degrees is received at light-receiving angles of 15 degrees and 25 degrees deviated from specular reflection light to the side closer to the incident light, and L*45 represents a lightness value of the intermediate coating film when light illuminated at an incident angle of 45 degrees is received at a light-receiving angle of 45 degrees deviated from specular reflection light to a side closer to the incident light.

2. The multilayer coating film according to claim 1, wherein the effect base coating film contains a color pigment in an amount of 40 parts by mass or less, on a solids basis, based on 100 parts by mass of the effect base coating film.

3. The multilayer coating film according to claim 1, further comprising a clear coating film on the colored base coating film.

4. An object comprising the multilayer coating film of claim 1.

5. A method for forming the multilayer coating film according to claim 1, comprising the following steps (1) to (4):

step (1) of applying an intermediate paint (V) to a substrate to form an intermediate coating film having an L*45 of 60 or more, wherein L*45 represents a lightness value of the intermediate coating film when light illuminated at an incident angle of 45 degrees is received at a light-receiving angle of 45 degrees deviated from specular reflection light to a side closer to the incident light;

step (2) of applying an effect base paint (X) to the intermediate coating film to form an effect base coating film, wherein a solids content of the effect base paint (X) during coating is 0.5 to 4.6 mass %, wherein the effect base coating film contains an effect pigment, a surface adjusting agent and a rheology control agent, the rheology control agent includes cellulose nanofibers, the effect pigment contains a light interference pigment, a vapor-deposited metal flake pigment, an aluminum flake pigment, or a combination thereof, the effect base coating film contains the effect pigment in an amount of 3 to 75 parts by mass, on a solids basis, based on 100 parts by mass of the effect base coating film, and the effect base coating film has a film thickness of 0.2 to 4.5 μm;

step (3) of applying a colored base paint (Y) to the effect base coating film to form a colored base coating film, wherein the colored base coating film contains a resin component and a color pigment, and a cured film thickness of the colored base coating film is 5.0 to 40 μm; and step (4) of separately or concurrently heating the intermediate coating film formed in step (1), the effect base coating film formed in step (2), and the colored base coating film formed in step (3) to cure the coating films, wherein the multilayer coating film has a graininess of 60 or less as measured in terms of HG value, and the multilayer coating film satisfies the following conditions:

when $X=[(C*45)^2+(C*75)^2]^{1/2}$ and $Y=[(L*15)^2+(C*15)^2]^{1/2}+[(L*25)^2+(C*25)^2]^{1/2}$, X is 80 or more and Y is 145 or more, wherein C*15, C*25, C*45, and C*75 represent chroma values of the multilayer coating film when light illuminated at an incident angle of 45 degrees is received at light-receiving angles of 15 degrees, 25 degrees, 45 degrees, and 75 degrees deviated from specular reflection light to the side closer to the incident light; and L*15 and L*25 represent lightness values of the multilayer coating film when light illuminated at an incident angle of 45 degrees is received at light-receiving angles of 15 degrees and 25 degrees deviated from specular reflection light to the side closer to the incident light.

* * * * *